United States Patent [19]

Pecsok

[11] Patent Number: 5,739,202
[45] Date of Patent: Apr. 14, 1998

US005739202A

[54] PROCESS FOR THE MANUFACTURE OF VINYLLDENE FLUORIDE POLYMER POWDER COATINGS

[76] Inventor: Roger L. Pecsok, 314 Abbey Rd., Berwyn, Pa. 19312

[21] Appl. No.: 797,195

[22] Filed: Feb. 11, 1997

[51] Int. Cl.[6] .................................................. C08K 27/16
[52] U.S. Cl. ........................... 524/520; 525/199; 525/934
[58] Field of Search ............................. 524/520; 525/199, 525/934

[56] References Cited

U.S. PATENT DOCUMENTS

| | | | |
|---|---|---|---|
| 2,681,324 | 6/1954 | Houhberg | 525/199 |
| 4,942,203 | 7/1990 | Conti-Ramsden et al. | 525/185 |

*Primary Examiner*—Melvyn I. Marquis
*Assistant Examiner*—D. Aylward

[57] ABSTRACT

A process for preparing a pigmented vinylidene fluoride polymer based powder coating composition that comprises steps of dispersing at least one pigment in a solution of a fluorine-free polymer that is compatible with the vinylidene fluoride polymer, blending said vinylidene fluoride polymer powder with the pigment dispersion, removal of solvent, milling, and classifying the compound to obtain the desired product.

6 Claims, No Drawings

PROCESS FOR THE MANUFACTURE OF VINYLLDENE FLUORIDE POLYMER POWDER COATINGS

FIELD OF INVENTION

This invention relates to a process for preparing pigmented film forming vinylidene fluoride polymer based powder compositions suitable for use in powder coatings applications.

BACKGROUND OF THE INVENTION

Vinylidene fluoride polymer based coatings are well known. They are used extensively for protection or decoration or both of a variety of substrates. These coatings are also known for their exceptional durability in terms of resistance to the effect of weathering and adverse chemical environments. A particularly useful category of vinylidene fluoride polymer coatings are the well known architectural paint finishes for building panels and other articles of sheet metal and metal extrusions. various systems have been devised for laying down a film forming composition of normally solid vinylidene fluoride polymers to give the substrates the desired long term protection against the effect of chemicals and weather. U.S. Pat. No. 3,324,069 to Koblitz et al. (1967) discloses a composition comprising a vinylidene fluoride polymer, a latent solvent for said vinylidene fluoride polymer, and an acrylate polymer dissolved in said latent solvent. U.S. Pat. No. 3,340,222 to Fang (1967) discloses a liquid film forming composition comprising a volatile organic liquid, a vinylidene fluoride polymer, an inorganic pigment, and adsorbed on the pigment an acrylate polymer. The organosol dispersions or paint finishes are applied by conventional means to the metallic substrate. After application, the coated substrate is baked at sufficient high temperature to drive off the solvent and fuse the vinylidene fluoride polymer film to the substrate. The increasing emphasis on environmental protection as defined by the Clean Air Act makes organic solvent containing film forming compositions no longer desirable. Accordingly, there is a growing need for paint finishes that are free of organic solvents.

Vinylidene fluoride polymer based powder coating compositions are suitable alternative to organosol dispersions. Processes for the preparation of film forming vinylidene fluoride polymer based powder coatings are disclosed in U.S. Pat. Nos. 4,770,939 to Sietses at al. (1988), 5,030,394 to Sietses et al. (1991), 5,177,150 to Polek (1993), 5,229,460 to Yousuf et al. (1993), and 5,346,727 to Simkin (1994). The processes of the prior art require that the ingredients of the compositions comprising a vinylidene fluoride polymer, an acrylic polymer, and at least one pigment be first melt compounded at about 190° C. to 240° C. using an extruder. Thereafter the extruded pellets are milled at cryogenic temperature at about –50° C. to about –150° C. using liquid nitrogen as coolant and sieved to obtain a powder having desired particle size. These processing steps suffer from several disadvantages. They require significant amount of energy to extrude and pelletize the polymer compound, and to cryogenically grind the pellets to obtain the powder. The cryogenic griding step also consumes a large amount of liquid nitrogen that is used as coolant. After cryogenic grinding, if desired or required, the powder is classified and larger particles are usually recylced to the mill. Regrinding of larger particles adds to the consumption of liquid nitrogen and energy input. A change from one color to another requires purging of the extruder of the compound having the first color by introducing a purge compound or the compound of the second color. This process inevitably produces an intermediate product of an undesired color that must be discarded as scrap, thereby resulting in waste of material and time. Accordingly, there is a need for a method that avoids extrusion compounding of the blend and cryogenic grinding of pellets to powder.

OBJECT OF THE INVENTION

Objects and advantages of my invention are:

(a) to provide a process to prepare a pigmented film forming vinylidene fluoride polymer powder without the need for extrusion compounding and cryogenic grinding;

to provide a process that allows for convenient and rapid color matching of the powder blend;

(c) to provide a process that simplifies classification of the powder into any desired particle size.

It is further an object of my invention to provide an inexpensive process that is simple to use and that obviates the use of extruders and cryogenic grinders.

SUMMARY OF INVENTION

My invention relates to an improved process for the preparation of a pigmented film forming vinylidene fluoride polymer based powder that comprise the steps of:

(a) dispersing at least one pigment in a fluorine-free polymer solution, whereby the solvent in said solution does not solvate the vinylidene fluoride polymer, (b) mixing the dispersion from step (a) with the vinylidene fluoride polymer powder, (c) removing the solvent from the mixture of step (b), (d) milling and classifying the compound from step (c) to obtain the desired powder particle size.

DETAILED DESCRIPTION OF THE INVENTION

Under the term "vinylidene fluoride polymer" used herein is meant not only the normally solid homopolymer of vinylidene fluoride but also the normally solid copolymers of vinylidene fluoride with at least one comonomer selected from the group consisting of tetrafluoroethylene, trifluoroethylene, chlorotrifluoroethylene, hexafluoropropylene and mixtures thereof, there being in said copolymer at least about 75 mole % of polymerized vinylidene fluoride repeat units. The vinylidene fluoride polymer used for the preparation of the film forming powders embodied herein are polymer powders that have a particle size less than 75 µm and preferably less than 25 µm in diameter. Particularly preferred are the fine powders formed by the emulsion polymerization method as described for example in U.S. Pat. Nos. 4,360,652 to Dohany (1982) and 4,569,978 to Barber (1986). The emulsion polymerization method produces a latex that contain spherical vinylidene fluoride polymer particles. These spheres are about –0.25 µm in diameter. In the finished polymer powder the spheres are clustered in agglomerates from about 2 µm to about 5 µm in diameter. The melt viscosity of the vinylidene fluoride polymer should be sufficiently low to be useful for powder coating. Low melt viscosity will assure good flow and film formation when the powder is oven-baked to fuse the film to the substrate. Desirable melt flow characteristics of such polymer powders are described in said U.S. Pat. No. 4,770,939.

The compositions of this process could include at least one organic or inorganic pigment but inorganic pigments are preferred because they usually have better resistance to the film fusion temperatures and have better resistance to the adverse effect of long term weathering. Preferred are ceramic metal oxide type pigments that are calcined. For white compositions that should be resistant to chalking or yellowing on exposure to weather, rutile type titanium dioxide is preferred. Other pigments are described in said U.S. Pat. No. 3,340,222. The pigment concentration in the compositions of this process can be from about 1 to about 40 weight percent of the compound, preferably from about 15 to about 20 weight percent.

Under the term "fluorine-free polymer" used herein is meant any normally solid polymer that is compatible with the vinylidene fluoride polymer. Preferred are the polymers composed of alkyl methacrylate, alkyl acrylate, and a blend thereof. Maximum retention of color and gloss on baking and weathering is usually obtained with these acrylic ester polymers. These acrylic ester polymers with ester sidegroups are preferentially adsorbed by the pigment during the preparation steps of this process as recognized in said U.S. Pat. No. 3,340,222. The fluorine-free polymer concentration used in this process can be from about 5 to about 40 weight percent and preferably from about 10 to about 30 weight percent of the combined polymers.

Said acrylic ester polymer is dissolved using a solvent that readily dissolves the acrylic ester polymer and does not dissolve the vinylidene fluoride polymer. Useful solvents are aromatic solvents as toluene or ketones; preferred solvent is methyl ethyl ketone. The polymer concentration in solution is from about 30 to about 60 weight percent. The solution may also contain a small about of a flow promoting agent. Flow promoting agents are well known in the art and are typically acrylic polymers of very low molecular weight.

Using a blender the acrylic ester polymer solution is mixed with the appropriate pigment or blend of pigments and the color of the blend is compared to the reference sample. The advantage of dispersing the pigment in said acrylic ester polymer solution is that it maximizes adsorption of the acrylic polymer on the pigment and the color can be easier and quicker adjusted or matched to the reference than with the finished powder. Upon matching the color, the pigmented acrylic polymer solution is blended with the vinylidene fluoride polymer powder by kneading using an appropriate device. After the vinylidene fluoride powder is completely wetted by said pigmented acrylic polymer solution, water is added, which is about 1 to about 10 percent of the combined weight of polymers in the blend. Addition of water reduces tackiness of the compound to the equipment and accelerate release of the solvent. Any other known non-solvent for the acrylic polymer is suitable to accelerate release of the solvent. Preferred non-solvent is water.

Thereafter the compound is transferred to a roll mill for shear mixing, quick release of the solvent, and forming of flakes. Instead of the roll mill any other shear mixing device known in the art can be used that allows removal of the solvent. The flakes are then milled at room temperature to obtain particles that are less than 75 μm in diameter. For this purpose a roller mill or any grinding or mincing device known in the art can be used. During mixing and milling steps the temperature of the compound must be kept below that melting point of the comprised polymers. The milled product is then passed through a screen and the oversize particles are recycled for more grinding. Any screening or classification device known in the art is suitable.

The finished powder is applied to a pretreated substrate, preferably coated with an appropriate primer, using any method known in the art to obtain a uniform distribution of the powder over the surface of the substrate. Electrostatic spraying is the preferred method of application. Following the application, the substrate covered with the powder layer is subjected to a temperature that will melt the polymer binder in the powder and for long enough time to form a smooth adherent film on the substrate.

In order to further illustrate my invention, below is an example:

EXAMPLE 5673 parts by weight of a commercially available acrylic polymer (ELVACITE 2008 from ICI Acrylics) is dissolved in 7000 parts by weight of methyl ethyl ketone. The following components were added to the solution using a medium shear stirring blade: 1150 parts by weight of commercially available $TiO_2$ pigment (R-960 from Du Pont); 945 parts by weight of commercially available black pigment (Black #1 from Shepard); 1245 parts by weight of commercially available green pigment (Green #223 from Shepherd); 200 parts by weight of a commercially available flow promoter (PERENOL F-40 from Henkel Chemical). The mixture is blended until it is homogeneous with no sign of any unmixed pigment particles as observed under 100x magnification. A metal chip is dipped into said mixture, dried, and compared to a reference color. If color adjustment is needed it can be made by the appropriate addition of pigment. Thereafter 13236 parts by weight of commercially available vinylidene fluoride homopolymer (PVDF) powder (HYLAR MP-6 from Ausimont USA) is blended into the pigmented acrylic solution by kneading. After all the PVDF is wetted by said pigmented acrylic solution, 1000 parts by weight of water is added to the mixture. The PVDF/acrylic/pigment compound is fed to a two-roll mill using a twin screw feeder. The compound is passed through the mill 2 to 3 times or until the compound forms a ribbon or flakes. The flakes are then milled at ambient temperature by additional milling and classified (Sweco Turbo Screen) to a particle size range that is less than 75 μm. The classified powder is then sprayed using an electrostatic gun (GEMA) onto a 2 mm thick aluminum panel (from Q-Panel Corp.) that has previously been cleaned and chromated. The coated panel is then baked at 232° C. for 15 minutes. The resulting coating was about 50 μm to about 65 μm thick, smooth, free of pinholes or other defects. No peeling, blistering, or loss of adhesion occurred when the crosshatched coating was immersed in boiling water for 20 minutes.

CONCLUSION AND SCOPE OF THE INVENTION

Thus the reader will see that my process for producing a pigmented film forming vinylidene fluoride polymer based powder coating composition is simple and does not require extrusion and cryogenic grinding of the compound. While my above description and example contain many specifications, these should not be construed as limitations on the scope of the invention, but rather as an exemplification of one preferred embodiment thereof. Accordingly, the scope of the invention should be determined not by the embodiments but by the appended claims and their legal equivalents.

I claim:

1. A process for producing a pigmented film forming vinylidene fluoride polymer powder that is suitable for powder coating applications comprising the steps of:

(a) dispersing at least one pigment in a solution comprising a fluorine-free polymer that is compatible with the vinylidene fluoride polymer and a solvent that dissolves said fluorine-free polymer and said solvent does not dissolve said vinylidene fluoride polymer, (b) mixing the dispersion from step (a) with a powder of said vinylidene fluoride polymer, (c) removing the solvent from the mixture of step (b), (d) milling and classifying the blend of step (c) to obtain a specific powder particle size.

2. The process according to claim 1 wherein said vinylidene fluoride polymer includes at least 75 mole percent vinylidene fluoride monomer units.

3. The process according to claim 2 wherein said vinylidene fluoride polymer includes comonomers selected from the group of monomers consisting of hexafluoropropylene and tetrafluoroethylene and mixtures thereof.

4. A pigmented vinylidene fluoride polymer powder composition that is prepared according to the process of claim 1.

5. A process of producing a pigmented film forming vinylidene fluoride polymer powder that is suitable for powder coating applications comprising the steps of:

(a) dispersing at least one pigment in a solution comprising a fluorine-free polymer that is compatible with the vinylidene fluoride polymer and a solvent that dissolves said fluorine-free polymer and said solvent does not dissolve said vinylidene fluoride polymer, (b) mixing the dispersion from step (a) with a powder or said vinylidene fluoride polymer, (c) addition of a non-solvent to the mixture from step (b), (d) removing said solvent and said non-solvent from the mixture from step(c), (e) milling and classifying the blend from step (d) to obtain a specific powder particle size.

6. The process according to claim 5 wherein said non-solvent is water.

* * * * *